United States Patent
Guarr et al.

(10) Patent No.: US 6,710,906 B2
(45) Date of Patent: *Mar. 23, 2004

(54) CONTROLLED DIFFUSION COEFFICIENT ELECTROCHROMIC MATERIALS FOR USE IN ELECTROCHROMIC MEDIUMS AND ASSOCIATED ELECTROCHROMIC DEVICES

(75) Inventors: Thomas F. Guarr, Holland, MI (US); Kathy E. Roberts, East Grand Rapids, MI (US); Rongguang Lin, Holland, MI (US); Kelvin L. Baumann, Holland, MI (US); David A. Theiste, Byron Center, MI (US); Punam Giri, Holland, MI (US); Elizabeth M. Sanford, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 72 days.

This patent is subject to a terminal disclaimer.

(21) Appl. No.: 10/054,108

(22) Filed: Nov. 13, 2001

(65) Prior Publication Data

US 2002/0141032 A1 Oct. 3, 2002

Related U.S. Application Data

(63) Continuation-in-part of application No. 09/724,118, filed on Nov. 28, 2000, now Pat. No. 6,445,486, which is a continuation-in-part of application No. 09/454,043, filed on Dec. 3, 1999, now Pat. No. 6,262,832.

(51) Int. Cl.[7] .................................................. G02F 1/15
(52) U.S. Cl. .................... 359/265; 359/267; 359/270; 359/273
(58) Field of Search ................... 359/265–275; 345/49, 105; 348/817

(56) References Cited

U.S. PATENT DOCUMENTS

| | | | |
|---|---|---|---|
| 4,402,573 A | 9/1983 | Jones | 359/265 |
| 4,902,108 A | 2/1990 | Byker | 359/265 |
| 5,457,564 A | * 10/1995 | Leventis et al. | 359/271 |
| 5,724,187 A | 3/1998 | Varaprasad et al. | 359/608 |
| 5,818,636 A | * 10/1998 | Leventis et al. | 359/273 |
| 5,910,854 A | 6/1999 | Varaprasad et al. | 359/273 |
| 5,998,617 A | 12/1999 | Srinivasa et al. | 544/347 |
| 6,002,511 A | 12/1999 | Varaprasad et al. | 359/265 |
| 6,183,878 B1 | 2/2001 | Berneth et al. | 428/583 |
| 6,188,505 B1 | 2/2001 | Lomprey et al. | 359/265 |
| 6,193,912 B1 | 2/2001 | Thieste et al. | 252/583 |
| 6,241,916 B1 | 6/2001 | Claussen et al. | 252/583 |
| 6,262,832 B1 | 7/2001 | Lomprey et al. | 359/265 |
| 6,277,307 B1 | 8/2001 | Berneth et al. | 252/583 |
| 6,301,038 B1 | 10/2001 | Fitzmaurice et al. | 359/265 |
| 6,445,486 B1 | * 9/2002 | Lomprey et al. | 359/265 |

FOREIGN PATENT DOCUMENTS

SU 830456 A1 2/1993 ......... C07D/213/20

* cited by examiner

*Primary Examiner*—Jordan M. Schwartz
*Assistant Examiner*—Jessica Stultz
(74) *Attorney, Agent, or Firm*—King & Jovanovic, PLC

(57) ABSTRACT

An electrochromic medium for use in an electrochromic device comprising: at least one solvent; an anodic electroactive material; a cathodic electroactive material; wherein at least one of the anodic and cathodic electroactive materials is electrochromic; and wherein at least one of the anodic and cathodic electroactive materials is associated with a diffusion coefficient controlling moiety which serves to lower the diffusion coefficient of the associated material relative to the same without the diffusion coefficient controlling moiety.

45 Claims, 1 Drawing Sheet

CONTROLLED DIFFUSION COEFFICIENT ELECTROCHROMIC MATERIALS FOR USE IN ELECTROCHROMIC MEDIUMS AND ASSOCIATED ELECTROCHROMIC DEVICES

CROSS-REFERENCE TO RELATED APPLICATIONS

This application is a continuation-in-part of U.S. application Ser. No. 09/724,118, filed Nov. 28, 2000, now U.S. Pat. No. 6,445,486 which is a continuation-in-part of U.S. application Ser. No. 09/454,043, filed Dec. 3, 1999, now U.S. Pat. No. 6,262,832, which are hereby incorporated herein by reference in their entirety.

BACKGROUND OF THE INVENTION

1. Field of the Invention

The present invention relates in general to electrochromic devices, and more particularly, to an electrochromic medium for use in an electrochromic device which comprises one or more controlled diffusion coefficient anodic and/or cathodic materials.

2. Background Art

Electrochromic devices have been known in the art for several years. While the utilization of electrochromic devices, such as electrochromic mirrors, has become increasingly popular, for example, among the automotive industry, issues relating to operating current and cell spacing of an electrochromic device remain problematic for a plurality of applications.

It is well known that the operating current of an electrochromic device is proportional to the diffusion coefficients of the electrochromic materials in the device and inversely proportional to the distance between the inner surfaces of the two spaced-apart substrates (Electrokhimya 21 (7) 918–22, 1985). Previous attempts to influence the operating current of an electrochromic device have relied on changing the solvent of the electrochromic medium (U.S. Pat. No. 5,140,455) or incorporating additives into the electrochromic medium (U.S. Pat. No. 5,142,407). The present disclosure describes the intentional modification of the electrochromic materials themselves to manipulate their diffusion coefficients, thereby controllably altering the operating current and/or cell spacing of an associated electrochromic device. This approach permits the use of a most preferred solvent rather than a more toxic or expensive alternative, while avoiding the additional cost and process complications of incorporating an additive. It will also be understood that, by using electrochromic materials with reduced diffusion coefficients, among other things: (1) operating current and/or cell spacing can be decreased to reduce the volume and cost of the electrochromic medium; (2) design parameters such as device coloring/bleaching time can be controllably altered; (3) manufacturing efficiency can be materially increased as a result of decreased device cell spacing; and (4) the formation of color bands (i.e. segregation) can be reduced or eliminated—just to name a few.

It is therefore an object of the present invention to provide an electrochromic medium which comprises one or more controlled diffusion coefficient anodic and/or cathodic electrochromic materials which remedy the aforementioned detriments and/or complications associated with the use of conventional electrochromic devices and associated medium components.

These and other objectives of the present invention will become apparent in light of the present specification, claims, and drawings.

SUMMARY OF THE INVENTION

The present invention is directed to an electrochromic medium for use in an electrochromic device comprising: (a) at least one solvent; (b) an anodic electroactive material; (c) a cathodic electroactive material; (d) wherein at least one of the anodic and cathodic electroactive materials is electrochromic; (e) wherein the anodic electroactive material comprises a diffusion coefficient less than approximately $8.00 \times 10^{-6}$ centimeters squared per second ($cm^2/s$) in propylene carbonate at approximately 25 degrees centigrade and/or the cathodic electroactive material comprises a diffusion coefficient less than approximately $3.00 \times 10^{-6}$ $cm^2/s$ in propylene carbonate at approximately 25 degrees centigrade; and (f) wherein the anodic and/or cathodic electroactive material comprises a diffusion coefficient controlling moiety which is non-redox active during normal operation of an associated electrochromic device.

The present invention is further directed to an electrochromic medium for use in an electrochromic device comprising: (a) at least one solvent; (b) an anodic electroactive material; (c) a cathodic electroactive material; (d) wherein at least one of the anodic and cathodic electroactive materials is electrochromic; and (e) wherein the anodic and/or cathodic electroactive materials are represented by at least one of the formulae A1–A15 and C1–C5, respectively, as provided herein.

In another aspect of the invention an electrochromic medium for use in an electrochromic device is disclosed as comprising: (a) at least one solvent; (b) an anodic electroactive material; (c) a cathodic electroactive material; (d) wherein at least one of the anodic and cathodic electroactive materials is electrochromic; and (e) wherein the anodic and/or cathodic electroactive material includes: (1) a first moiety; and (2) a diffusion coefficient controlling moiety, wherein the diffusion coefficient controlling moiety comprises at least one constituent which serves to decrease the diffusion coefficient of the first moiety in the at least one solvent relative to the first moiety without the diffusion coefficient controlling moiety.

The present invention is also directed to, among other things, novel anodic and cathodic materials having controllably reduced diffusion coefficients.

BRIEF DESCRIPTION OF THE DRAWINGS

The invention will now be described with reference to the drawings wherein.

DETAILED DESCRIPTION OF THE INVENTION

Figure 1:
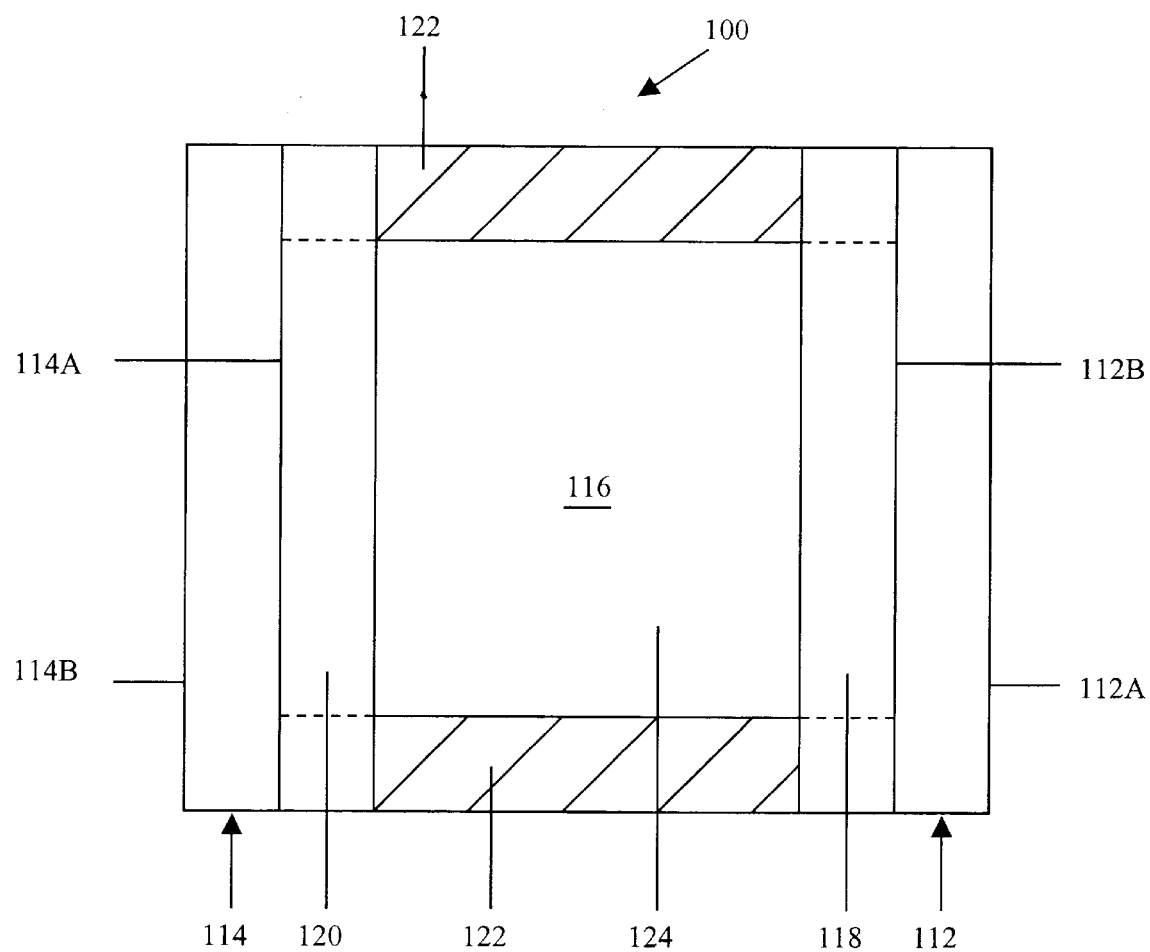
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having front surface 112A and rear surface 112B, second substrate 114 having front surface 114A and rear surface 114B, and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector" and U.S. application Ser. No. 09/343,345 entitled "Electrode Design For Electrochromic Devices," both of which are incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun.

Second substrate 114 may be fabricated from similar materials as that of first substrate 112. However, if the electrochromic device is a mirror, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

Electronically conductive material 120 may vary depending upon the intended use of the electrochromic device. For example, if the electrochromic device is a mirror, then the material may comprise a transparent conductive coating similar to electronically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electronically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos.: 4,297,401; 4,418,102; 4,695,490; 5,596,023; 5,596,024; and 6,157,480, all of which are incorporated herein by reference in their entirety.

For purposes of the present disclosure, electrochromic medium 124 comprises at least one solvent, an anodic material, and a cathodic material, wherein at least one of the anodic and cathodic materials exhibits low diffusion coefficient characteristics.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase:—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same" and International Patent Application Ser. No. PCT/U.S. Pat. No. 98/05570 entitled "Electrochromic Polymeric Solid Films, Manufacturing Electrochromic Devices Using Such Solid Films, And Processes For Making Such Solid Films And Devices," both of which are incorporated herein by reference in their entirety.

More than one anodic and cathodic material can be combined to give a pre-selected color as described in U.S. Pat. No. 5,998,617, U.S. Pat. No. 6,020,987, U.S. Pat. No. 6,037,471, U.S. Pat. No. 6,141,137 and PCT Application Publication No. WO98/44348, all of which are hereby incorporated herein by reference in their entirety.

The anodic and cathodic materials can be combined or linked by a bridging unit as described in International Application Serial No. PCT/WO97/30134 entitled "Electrochromic System," which is incorporated herein by reference in its entirety. The electrochromic materials can additionally include near infrared (NIR) absorbing compounds as described in U.S. Pat. No. 6,193,912, which is also incorporated herein by reference in its entirety.

It is also possible to link anodic materials or cathodic materials by similar methods. The concepts described in these applications/patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled "Coupled Electrochromic Compounds With Photostable Oxidation States," which is hereby incorporated herein by reference in its entirety.

The concentration of the electrochromic materials can be selected as taught in U.S. Pat. No. 6,137,620 entitled "Electrochromic Media With Concentration Enhanced Stability, Process For The Preparation Thereof, and Use In Electrochromic Devices," the entirety of which is hereby incorporated herein by reference.

Additionally, a single-layer, single-phase medium may include a medium where the anodic and cathodic materials are incorporated into a polymer matrix as is described in International Application Serial No. PCT/WO99/02621 entitled "Electrochromic Polymer System" and International Patent Application Ser. No. PCT/US98/05570 entitled "Electrochromic Polymeric Solid Films, Manufacturing Electrochromic Devices Using Such Solid Films, And Processes For Making Such Solid Films And Devices."

(2) Multi-layer—the medium may be made up in layers and includes a material attached directly to an electronically conducting electrode or confined in close proximity thereto which remains attached or confined when electrochemically oxidized or reduced.

(3) Multi-phase—one or more materials in the medium undergoes a change in phase during the operation of the device, for example a material contained in solution in the ionically conducting electrolyte forms a layer on the electronically conducting electrode when electrochemically oxidized or reduced.

In addition, electrochromic medium 124 may comprise other materials, such as light absorbers, light stabilizers, thermal stabilizers, antioxidants, thickeners, viscosity modifiers, tint providing agents, redox buffers, and mixtures thereof. Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2--ethyl-2'-ethoxyanilide sold by Sandoz Color & Chemicals under the trademark Sanduvor VSU—to name a few.

Conventional anodic materials may include any one of a number of materials including ferrocene, substituted ferrocenes, substituted ferrocenyl salts, substituted phenazines, phenothiazine, substituted phenothiazines, thianthrene, substituted thianthrenes. Examples of anodic materials may include di-tert-butyl-diethylferrocene, 5,10-dimethyl-5,10-dihydrophenazine, 3,7,10-trimethylphenothiazine, 2,3,7,8-tetramethoxythianthrene, and 10-methylphenothiazine. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof, as well as U.S. Pat. No. 6,188,505 B1 entitled "Color-Stabilized Electrochromic Devices," both of which are incorporated herein by reference in their entirety.

Specially designed low diffusion coefficient anodic materials of the present invention include materials represented by at least one of the formulae:

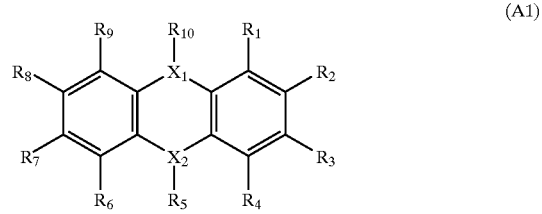

(A1)

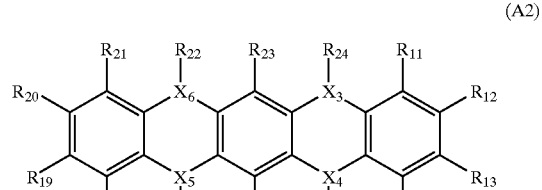

(A2)

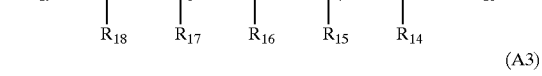

(A3)

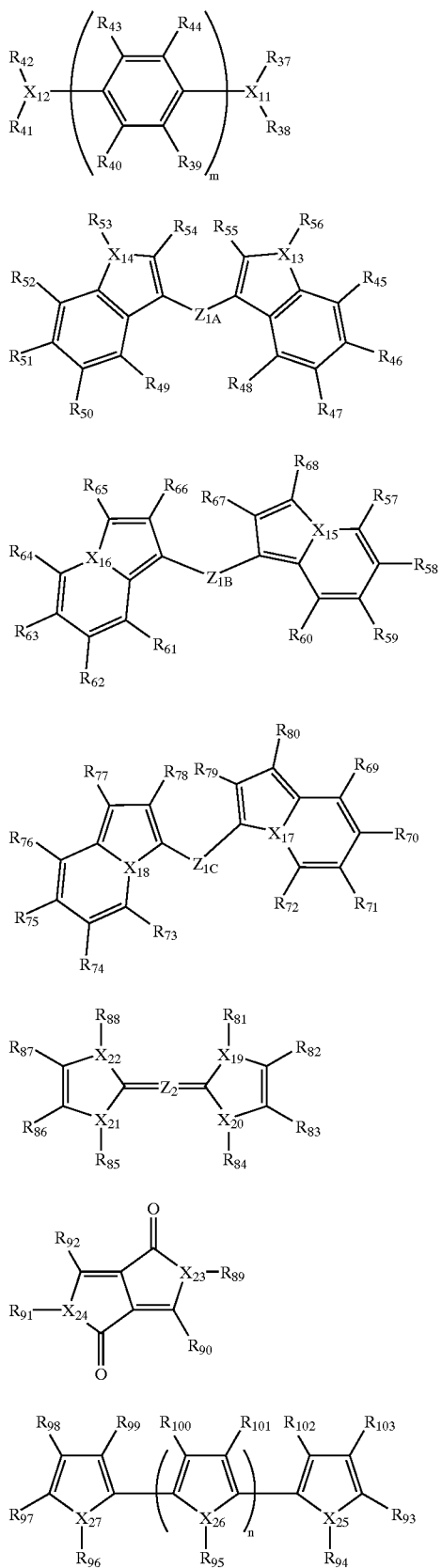

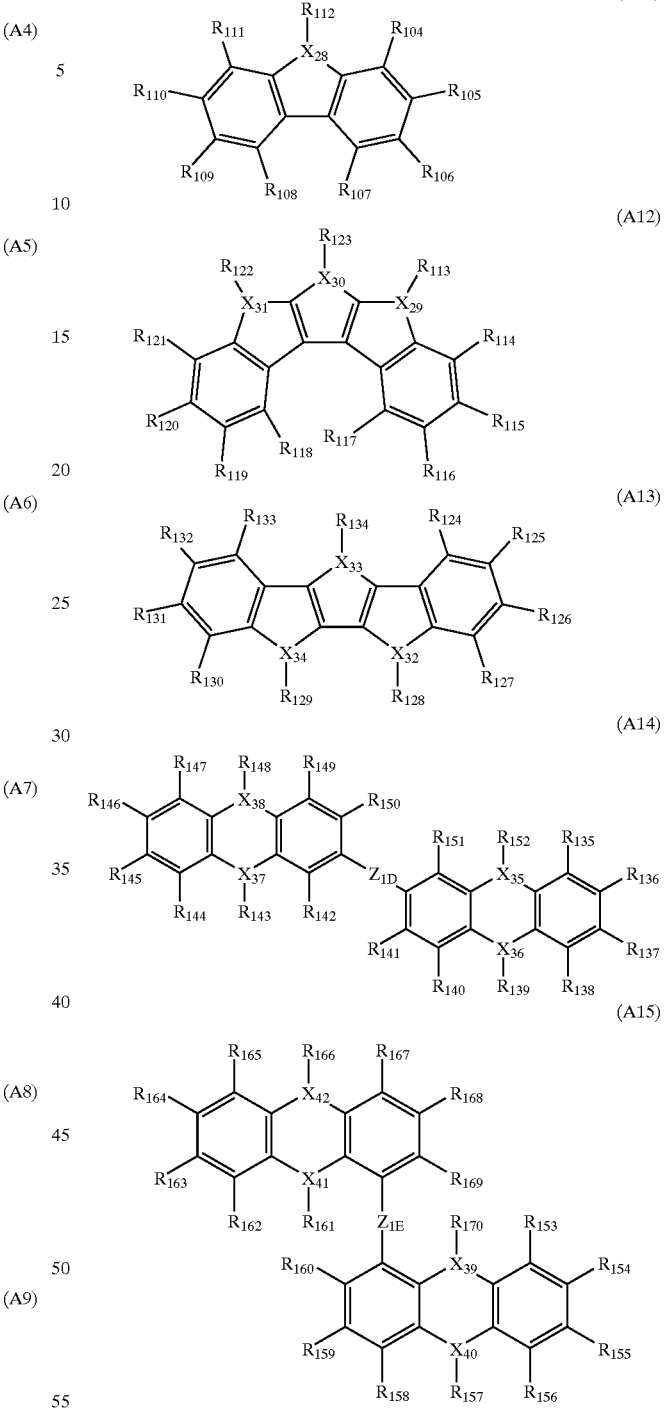

wherein $X_1$–$X_{42}$ are the same or different and comprise a single bond, N, O, S or Se; wherein m is an integer ranging from 1 to approximately 3; wherein n is an integer ranging from 0 to approximately 10; wherein $Z_{1A-E}$ are the same or different and comprise —[CH=CH]$_S$—, —[C≡C]$_S$—, —N=N—, or p-phenyl; wherein s is an integer ranging from 0 to approximately 4; wherein $Z_2$ comprises =CH—[$Z_{1A}$]$_t$—CH=, or =N—[$Z_{1A}$]$_t$—N=; wherein t is an integer ranging from 0 to approximately 4; wherein $R_1$–$R_{170}$ are the same or different and comprise a lone electron pair, H, a halogen, a straight or branched alkyl, aryl, alkaryl, aralkyl, or alkoxy group containing 1 to approximately 50 carbon atom(s), wherein the carbon atoms may be a linking group to, or part of, one or more functional groups comprising alcohols; thiols; thioethers; nitriles; nitro constituents; sulfoxides; sulfonates; phosphonium constituents; phosphonates; phosphonites; ammonium constituents; carbonyls, including carbonates, carbamates; ketones; esters; and amides; ethers, including polyethers; amines, including tertiary amines; and mixtures thereof; and wherein $R_1$–$R_{170}$ are non-redox active during normal operation of an associated electrochromic device. It will be understood that, regardless of its ordinary meaning, the term "non-redox active" as used herein, is defined as not undergoing electrochemical reduction or oxidation during application and/or removal of an electrical potential required for normal operation of an associated electrochromic device.

Conventional cathodic materials may include, for example, viologens, such as methyl viologen tetrafluoroborate, octyl viologen tetrafluoroborate, or benzyl viologen tetrafluoroborate. It will be understood that the preparation and/or commercial availability for each of the above-identified cathodic materials is well known in the art.

While specific cathodic materials have been provided, for illustrative purposes only, numerous other conventional cathodic materials are likewise contemplated for use including, but by no means limited to, those disclosed in previously referenced and incorporated U.S. Pat. No. 4,902, 108. Indeed, the only contemplated limitation relative to the cathodic material is that it should not adversely affect the electrochromic performance of the device 100. Moreover, it is contemplated that the cathodic material may comprise a polymer film, such as various substituted polythiophenes, polymeric viologens, an inorganic film, or a solid transition metal oxide, including, but not limited to, tungsten oxide.

Specially designed low diffusion coefficient cathodic materials of the present invention include one more materials represented by the following formulae:

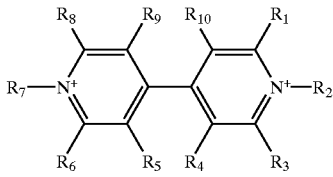
(C1)

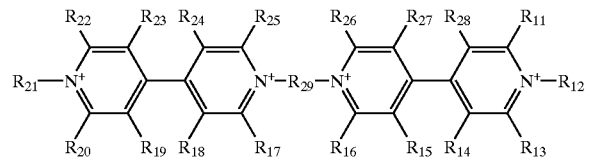
(C2)

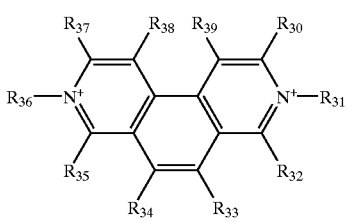
(C3)

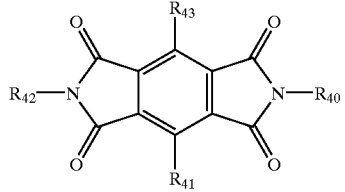
(C4)

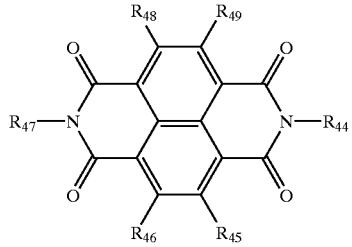
(C5)

wherein $R_1$–$R_{49}$ are the same or different and comprise H, a halogen, a straight or branched alkyl, aryl, alkaryl, aralkyl, or alkoxy group containing 1 to approximately 50 carbon atom(s), wherein the carbon atoms may be a linking group to, or part of, one or more functional groups comprising alcohols; thiols; thioethers; nitriles; nitro constituents; sulfoxides; sulfonates; phosphonium constituents; phosphonates; phosphonites; ammonium constituents; carbonyls, including carbonates, carbamates; ketones; esters; and amides; ethers, including polyethers; amines, including tertiary amines; and mixtures thereof, and wherein $R_1$–$R_{49}$ are non-redox active during normal operation of an associated electrochromic device.

Without being bound to any particular theory, it is believed that the above identified specially designed low diffusion coefficient anodic and cathodic materials which include one or more diffusion coefficient controlling moieties ($R_1$–$R_{170}$ for A1–A15 and $R_1$–$R_{49}$ for C1–C5) appended to a base first moiety (i.e. an unsubstituted or simple substituted electroactive material) cooperatively interact with the associated solvent in the electrochromic medium, thereby controllably slowing diffusion of the materials in the solvent(s). As was previously discussed, by controllably altering the diffusion coefficients of the anodic and/or cathodic materials, device operating current and cell spacing, among other things, can, in turn, be altered toward beneficially affecting operation, cost, and/or manufacturing efficiency of an associated electrochromic device.

For illustrative purposes only, the concentration of the anodic and cathodic materials can range from approximately 1 mM to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, the solvent of electrochromic medium 124 may comprise any one of a number of common, commercially available solvents including 3-methylsulfolane, glutaronitrile, dimethyl sulfoxide, dimethyl formamide, acetonitrile, tetraglyme and other polyethers, alcohols such as ethoxyethanol, nitriles, such as 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed as being associated with the electrochromic medium, numerous other solvents or plasticizers that would be known to those having ordinary skill in the art having the present disclosure before them are likewise contemplated for use.

Electrochromic devices having as a component part an electrochromic medium comprising one or more current-reducing additives can be used in a wide variety of applications wherein the transmitted or reflected light can be modulated. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

The electrochromic media of the present invention utilize many different low diffusion coefficient anodic and cathodic materials. The preparation and/or commercially available sources are provided herein, unless the material is well known in the art. It will be understood that, unless specified otherwise, the starting reagents are commercially available from Aldrich Chemical Co., Milwaukee, Wis., or other common chemical suppliers. It will be further understood that conventional chemical abbreviations will be used when appropriate including the following: grams (g); milliliters (ml); moles (mol); millimoles (mmol); molar (M); millimolar (mM); and hours (h).

In support of the present invention, several experiments were conducted wherein the diffusion coefficient characteristics of anodic and cathodic materials having one or more diffusion coefficient controlling moieties were compared to anodic and cathodic materials without the aforementioned moieties. The following table provides the anodic and cathodic materials utilized in the experiments below:

was added at room temperature 200 g (1.2 mol) of ammonium hexafluorophosphate dissolved in 200 ml of water. Immediately after this addition, a white solid formed, and the resulting mixture was stirred for 30 minutes. The solid was collected by filtration and washed with deionized water, methanol and finally ether. The pure product (1-bromo-3-(triphenylphosphonium)propane hexafluoro-phosphate) was obtained in 94% yield by recrystallization from acetone/ether followed by drying in an oven at 85° C.

A mixture of 4,4'-dipyridyl (18 g, 0.115 mol) and 1-bromo-3-(triphenylphosphonium)propane hexafluorophosphate (200 g, 0.378 mol) in 400 ml of N,N-dimethylformamide was heated to 90–95° C with stirring over 40 h. After cooling to room temperature, the resulting yellow product (the mixed hexafluorophosphate/bromide salt) was isolated by precipitation with acetone (1 L). An excess of ammonium hexafluorophosphate (100 g) in hot water (50 ml) was then added to a hot solution of the crude product in a mixture of water and methanol (250 ml, 1:1 by volume). The solid that separated on cooling was washed with water and methanol.

An excess of tetrabutylammonium hydrogensulfate (200 g) in acetone (300 ml) was added to the solution of hexafluorophosphate product in acetonitrile (200 ml). Immediately after this addition, a white solid formed, and the resulting mixture was stirred at reflux for 1 hr. The solid was collected by filtration and washed with acetone and ether.

To isolate the tetrafluoroborate salt, an excess of sodium tetrafluoroborate (100 g) in hot water (120 ml) was added to a hot solution of hydrogensulfate product in a mixture of water and methanol (150 ml, 1:1 by volume). The solid that separated on cooling was washed with water and methanol.

The tetrafluoroborate product was purified by dissolving in 250 ml of boiling acetonitrile and subsequent treatment with activated charcoal. After filtration, the solvent was partially removed by rotary evaporation and the pure product was recrystallized from acetonitrile/ethanol to yield 80 g of a white powder (62.5%).

| Anodic/Cathodic Material | Preparation/Commercial Source |
| --- | --- |
| Methylviologen [$BF_4$]$_2$ | Common preparation in open literature |
| Ethylviologen [$BF_4$]$_2$ | Common preparation in open literature |
| Octylviologen [$BF_4$]$_2$ | Prepared in an analogous manner to methylviologen [$BF_4$]$_2$ provided in the open literature |
| 1,1'-bis(3-(triphenylphosphonium)propyl)-4,4'-dipyridinium tetrakis(tetrafluoroborate) | Provided herein below |
| 1,1'-bis(6-(triphenylphosphonium)hexyl)-4,4'-dipyridinium tetrakis(tetrafluoroborate) | Provided herein below |
| N,N'-bis(3-(triphenylphosphonium)propyl)-3,8-phenanthrolinium tetrakis(tetrafluoroborate) | Provided herein below |
| N,N'-bis(5-(triphenylphosphonium)pentyl)-1,4,5,8-naphthalenetetracarboxylic diimidium bis(tetrafluoroborate) | Provided herein below |
| Ferrocene | Aldrich |
| 5,10-dimethyl-5,10-dihydrophenazine | See U.S. Pat. No. 6,242,602 B1 |
| Bis-5,10-[2-(triethylammonium)ethyl]-5,10-dihydrophenazine bis(tetrafluoroborate) | Provided herein below |
| Bis-5,10-[4-(triethylammonium)butyl]-5,10-dihydrophenazine bis(tetrafluoroborate) | Provided herein below |
| 3,10-dimethoxy-7,14-triethylammoniumbutyltriphenodithiazine tetrafluoroborate | Provided herein below |
| TMBYHB | See U.S. Application Serial No. 09/724,118 |

Synthesis of 1,1'-bis(3-(triphenylphosphonium) propyl)-4-'-dipyridinium tetrakis(tetrafluoroborate)

To a solution of 186 g (0.4 mol) of 1-bromo-3-(triphenylphosphonium)-propane bromide in 1L of water Synthesis of 1,1'-bis(6-(triphenylphosphonium) hexyl)-4,4'-dipyridinium tetrakis(tetrafluoroborate)

To a 500 ml, single-neck flask was added 15.6 g of 4,4'-dipyridyl, 195.2 g of 1,6-dibromohexane, and 200 ml of acetonitrile. The solution was stirred and heated to reflux for 16 hours. After 16 hours, the heat was shut off and the mixture cooled to room temperature. The yellow dibromide salt was filtered and washed twice with 50 ml portions of acetone, then dried in a vacuum oven set at 70° C. for 4 hours. The salt was then transferred to a 1 L, single-neck flask and to it was added 300 ml of methanol, 150 ml of 40% sodium tetrafluoroborate aqueous solution, and 150 ml of water. The slurry was stirred and heated to 80° C. to dissolve, then cooled in a refrigerator to 0°C. After 4 hours at 0°C., a white crystalline tetrafluoroborate salt was filtered off. The filter cake was rinsed twice with 50 ml of deionized water.

The filter cake was charged to a 500 ml, 1-neck, round-bottom flask along with 52.6 g of triphenylphosphine and 200 ml of acetonitrile. The reaction mixture was stirred and heated to reflux for 16 hours. After 16 hours, it was cooled to room temperature and 400 ml of ethyl acetate was slowly added. The mixture was placed in a 0° C. refrigerator for 4 hours, then the mixed tetrafluoroborate/bromide salt was filtered off. The filter cake was rinsed twice with 50 ml portions of acetone then dried in a vacuum oven set at 70° C. for 4 hours.

It was removed from the vacuum oven and added to a 1 L, single-neck flask along with 300 ml of methanol, 150 ml of 40% sodium tetrafluoroborate aqueous solution, and 150 ml of water. The reaction mixture was stirred and heated to 80° C. to dissolve the solids and was then cooled to 0° C. in a refrigerator. After 4 hours, a white, crystalline tetrafluoroborate salt was filtered off. It was rinsed twice with 50 ml portions of deionized water and then recrystallized twice from methanol/aqueous sodium tetrafluoroborate. The overall yield was 61.0 g (51%).

Synthesis of N,N'-bis(3-(triphenylphosphonium) propyl)-3,8-phenanthrolinium tetrakis (tetrafluoroborate)

First, 3,8-phenanthroline was prepared according to the literature substituting dimethoxyacetaldehyde for diethoxyethanol in the first step (Gill, E. W. and Bracher, A. W. *J. Heterocyclic Chem.* 1983, 20, 1107–1109).

Second, a mixture of 1.0 g (0.0056 mol) of 3,8-phenanthroline and 18.0 g (0.034 mol) of (3-bromopropyl)triphenylphosphonium hexafluorophosphate (obtained from the metathesis of (3-bromopropyl)triphenylphosphonium bromide with NaPF$_6$) and 50 mL of DMF was heated under N$_2$ to 95° C. overnight. After cooling to room temperature 150 mL of acetone was added to the reaction and a solid precipitated. This solid was isolated by vacuum filtration and then dissolved in a minimum amount of water. To this solution was added 1M aqueous NaBF$_4$ until a precipitate formed. The solid was isolated by vacuum filtration and then recrystallized twice from ethanol and 1M aqueous NaBF$_4$ and once from ethanol, acetonitrile and 1M aqueous NaBF$_4$. Decolorization was achieved with charcoal during recrystallization. After drying under vacuum at 70° C. 4.1 g (65% yield) of an off-white solid was obtained.

Synthesis of N,N'-bis(5-(triphenylphosphonium pentyl)-1,4,5,8-naphthalenetetra-carboxylic diimidium bis(tetrafluoroborate)

First, a mixture of 10.0 g (0.04 mol) of 1,4,5,8-naphthalenetetracarboxylic dianhydride, 10.4 g (0.10 mol) of 5-amino-1-pentanol and 100 mL of water was refluxed for 7 hours. After cooling to room temperature, a pink solid was isolated by vacuum filtration and dried under vacuum at 70° C. to give 10.1 g (61% yield) of product.

Second, a round bottom flask was charged with 5.0 g (0.011 mol) of N,N'-bis(5-hydroxypentyl)-1,4,5,8-naphthalenetetracarboxylic diimide and purged with nitrogen. To this was added 25 mL (0.27 mol) of PBr$_3$. After stirring at room temperature for 1 hour, the mixture was heated until homogeneous and held at that temperature for 4 hours. After cooling to room temperature the mixture was carefully poured onto ice to give a pink solid. The solid was isolated by vacuum filtration and rinsed with water until the filter cake contained no residual acid. The solid was dried under vacuum at 70° C. to give 6.3 g (100% yield) of product.

Third, a mixture of 4.0 g (0.0071 mol) of N,N'-bis(5-bromopentyl)-1,4,5,8-naphthalenetetracarboxylic diimide and 7.5 g (0.029 mol) triphenylphosphine in 200 mL of DMF was heated to approximately 100° C. overnight. The reaction mixture was poured into 500 mL of a 1:1 mixture of ethanol and water. A small amount of white solid formed and was filtered from the solution. To the solution was added 100 mL of 1M aqueous NaBF$_4$ and a precipitate formed. The rose colored solid was isolated by vacuum filtration and purified by column chromatography (silica eluting with 1:1 CH$_3$OH:CH$_3$CN) followed by recrystallization (CH$_3$OH and 1.0 M aqueous NaBF$_4$) to give a low yield of product as a peach colored solid.

Synthesis of Bis-5,10-[2-(triethylammonium)ethyl]-5,10-dihydrophenazine bis(tetrafluoroborate)

To a 1 L 3-neck round-bottom flask was added 18.0 g of phenazine, 50.0 g of 2-bromoethanol, 26.1 g of sodium dithionite, 21.2 g of powdered sodium carbonate, 6.2 g of methyltributylammonium chloride, 200 ml of acetonitrile, and 10 ml of water. This slurry was stirred and refluxed for 48 hours under a nitrogen blanket, at which time, the reaction was complete. To the refluxing reaction mixture, 400 ml of water was added over 30 minutes with a liquid addition funnel. The reaction was then cooled to room temperature and then the product was isolated on a Buchner funnel and washed with 100 ml of water. The bis-5,10-(2-hydroxyethyl)-5,10-dihydrophenazine was then dried under vacuum at 70° C. overnight. The dry weight of this intermediate was 25.0 g for a 92.6% yield.

This intermediate was added to a 1 L 3-neck round-bottom flask and was dissolved in 200 ml of pyridine. The solution was cooled to 0° C., after which 15 ml of methanesulfonyl chloride was added dropwise over 30 minutes while keeping the pot temperature below 20° C. The solution was stirred for 2 hours, then another 10 ml of methanesulfonyl chloride was added dropwise to the 0° C. solution. The reaction solution was allowed to warm to room temperature and was stirred for an additional 2 hours. The reaction was quenched and product was precipitated by the dropwise addition of 400 ml of water. The bis-5,10-2-(methanesulfonylethyl)-5,10-dihydrophenazine was filtered over a Buchner funnel and washed with copious amounts of water to remove pyridine. It was placed in a vacuum oven to dry at 80° C. overnight. The dry weight of this intermediate was 25.4 g for a 64.4% yield.

The final step is the quaternization of the mesylate intermediate with triethylamine. 25.4 g of the mesylate intermediate was added to a 500 ml round-bottom flask along with 250 ml of acetonitrile and 40 ml of triethylamine. This slurry was heated to reflux temperature under an inert atmosphere for 14 days. After cooling to room temperature, 200 ml of a 1:1 mixture of acetone and ethyl acetate was added to the reaction solution. After allowing 3 days for crystallization, the product was filtered off over a Buchner funnel and was washed with 100 ml of acetone.

The dimesylate salt of the bis-5,10-2-(triethylammoniumethyl)-5, 10-dihydrophenazine was dissolved in 500 ml of hot water, and to it was added 50 ml of a 40% aqueous sodium tetrafluoroborate solution. The metathesis product precipitated out as an oil, which was then crystallized from a solution of 400 ml of methanol and 200 ml of water. The final product was then isolated as a crystalline solid.

Synthesis of Bis-5,10-[4-(triethylammonium)butyl]-5,10-dihydrophenazine bis(tetrafluoroborate)

To a 250 ml 3-neck round-bottom flask was added 1.8 g of phenazine, 12.0 g of 1-bromo-4-(triethylammonium) butane bromide, 2.56 g of sodium carbonate, 2.61 g of sodium dithionite, 0.30 g of sodium iodide, 0.45 g of methyltributylammonium chloride, 50 ml of acetonitrile, and 2.5 ml of water. The slurry was heated to reflux under a nitrogen atmosphere for 20 hours.

To the slurry was added 75 ml of water, followed by 25 ml of 1M sodium tetrafluoroborate aqueous solution. This solution was cooled to 0–5° C. for 4 hours. The bis-5,10-[4-(triethylammonium)butyl]-5,10-dihydrophenazine bis (tetrafluoroborate) was filtered off and washed with water. A second crop formed in the filtrates which was also filtered off. The first crop weighed 5.3 g and the second crop 1.4 g, for a total yield of 100%. The two crops were combined and recrystallized from 50 ml of acetonitrile, 75 ml of water, and 25 ml of 1M sodium tetrafluoroborate aqueous solution, to give a light green crystalline product.

Synthesis of 3,10-dimethoxy-7,14-(4-triethylammonium-butyl)triphenodithiazine (bistetrafluoroborate)

The product was synthesized over four steps:

Step 1: N,N'-dianisyl-1,4-phenylenediamine:

A flame-dried one liter three neck round bottom flask was charged with 4-bromoanisole (50.4 g, 0.26 mole), 1,4-phenylenediamine (12.0 g, 0.11 mole), 1,1'-bis (diphenylphosphino)ferrocene (1.776 g, 0.0032 mole), tris (dibenzylideneacetone)dipalladium(0) (0.98 g, 0.001 mole), sodium tert-butoxide (31.2 g, 0.32 mole), and anhydrous toluene (350 ml). The reaction mixture was heated to 90° C. for 48 hours. The reaction mixture was cooled to room temperature and hexane (400 ml) was added. The solid was filtered and dissolved in ethanol (400 ml). Sodium dithionite (20.0 g) was dissolved in 300 ml water and added to the ethanol solution. This was heated to reflux for 30 minutes. After the solution was cooled to room temperature, the solid was filtered off and washed with water to give 25.7 g (72%) of N,N'-dianisyl-1,4-phenylenediamine.

Step 2: 3,10-dimethoxytriphenodithiazine:

A mixture containing the product from step 1 (23.7 g, 0.074 mole), sulfur (12.6 g), iodine (2.6 g) and dichlorobenzene (230 ml) was heated to reflux for 48 hours. The reaction mixture was then cooled to room temperature and phenylhydrazine (25 ml) was added. The reaction mixture was slowly heated again to 140° C. for 4 hours. The $H_2S$ gas that formed was scrubbed in 20% sodium hydroxide solution. (IMPORTANT NOTE: the $H_2S$ gas evolved in this reaction is excessive extremely toxic. Appropriate precautions should be taken.) After the reaction mixture was cooled to room temperature, the product was filtered and washed with hexane to give 21.0 g (74%) of 3,10-dimethoxytriphenodithiazine.

Step 3: 3,10-dimethoxy-7,14-(4-bromobutyl) triphenodithiazine:

A mixture of 3,10-dimethoxytriphenodithiazine (20.0 g, 0.055 mole), 50% sodium hydroxide (52 g), sodium dithionite (52.0 g), 1,4-dibromobutane (131 ml), water (200 ml), and methyltributylammonim chloride (5.25 g) was heated to 80° C. for 48 hours. The reaction mixture was quenched by adding acetonitrile (300 ml) and water (300 ml). After the reaction mixture was cooled to room temperature, the product was filtered and washed with water to give 19.00 g (53%) of 3,10-dimethoxy-7,14-(4-bromo-butyl)triphenodithiazine.

Step 4: 3,10-dimethoxy-7,14-(4-triethylammoniumbutyl) triphenodithiazine bis(tetrafluoroborate):

A solution of 3,10-dimethoxy-7,14-(4-bromobutyl) triphenodithiazine (19.0 g) and triethylamine (65 ml) in acetonitrile (1000 ml) was heated at 65° C. for 28 hours. The reaction mixture was cooled to room temperature and the solvent was removed by rotary evaporation to give a green oil. The bromide salt of the desired product was converted to the tetrafluoroborate salt by dissolving the green oil in acetonitrile (250 ml), water (125 ml), and a 4M solution of sodium tertrafluoroborate (25 ml). The solution was heated to reflux for 30 minutes and cooled in a refrigerator overnight. The solid was isolated and recrystallized again as above to 12.0 g (47%) of light green 3,10-dimethoxy-7,14-(4-triethylammoniumbutyl)triphenodithiazine bis (tetrafluoroborate).

For purposes of clarifying the structures associated with some of the above-identified anodic and cathodic electrochromic materials, and to eliminate any ambiguity associated with the nomenclature of the same, their chemical structures are provided below:

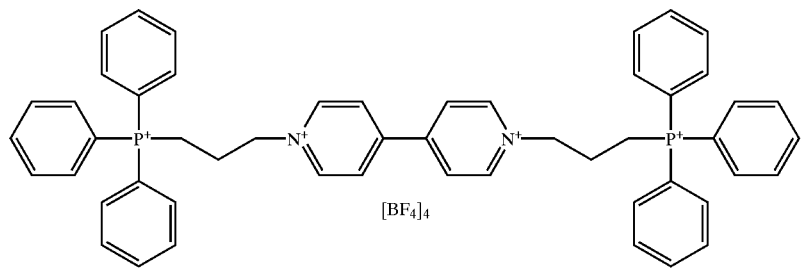

1,1'-bis(3-(triphenylphosphonium)propyl)-4,4'-dipyridinium tetrakis(tetrafluoroborate)

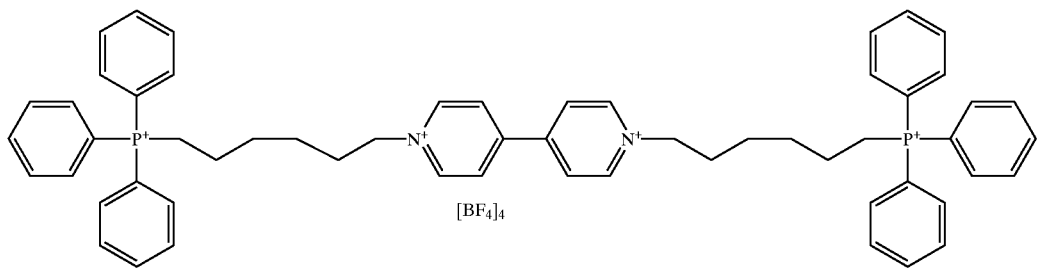
1,1'-bis(6-(triphenylphosphonium)hexyl)-4,4'-dipyridinium tetrakis(tetrafluoroborate)
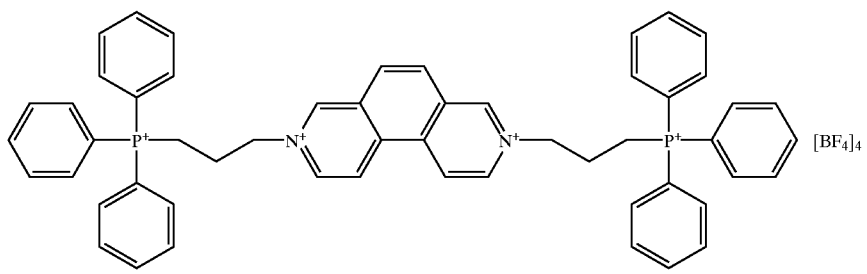
N,N'-bis(3-(triphenylphosphonium)propyl)-3,8-phenanthrolinium tetrakis(tetrafluoroborate)
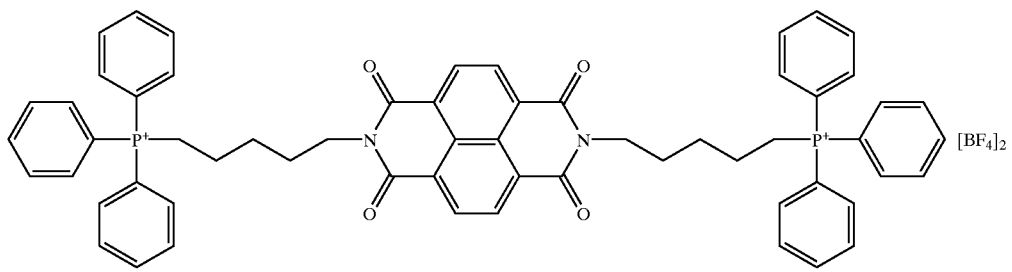
N,N'-bis(5-(triphenylphosphonium)pentyl)-1,4,5,8-naphthalenetetracarboxylic diimidium bis(tetrafluoroborate)
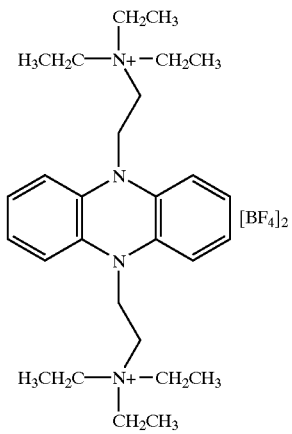
Bis-5,10-[2-(triethylammonium)ethyl]-5,10-dihydrophenazine bis(tetrafluoroborate)

-continued

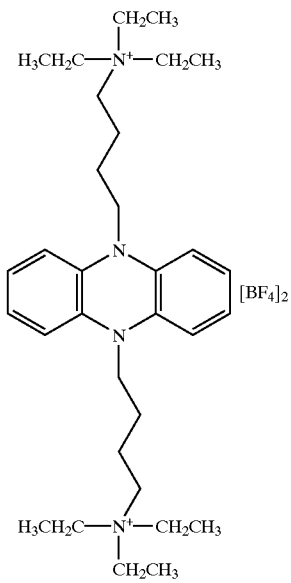
Bis-5,10-[4-(triethylammonium)butyl]-5,10-dihydrophenazine bis(tetrafluoroborate)

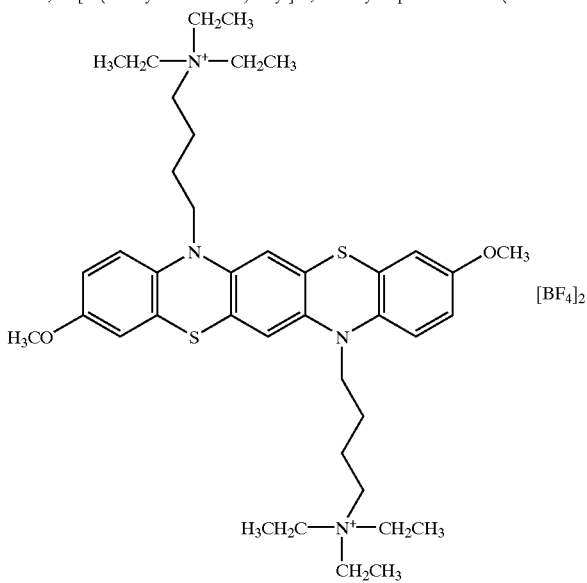
3,10-dimethoxy-7,14-(4-triethylammoniumbutyl)triphenodithiazine bis(tetrafluoroborate)

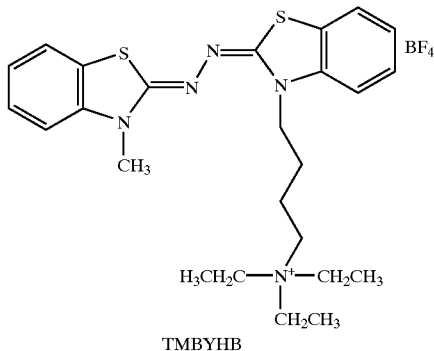
TMBYHB

In support of the present invention, several experiments were conducted wherein diffusion coefficients were quantitatively measured for numerous anodic and cathodic materials provided herein.

Common methods for the measurement of diffusion coefficients include linear sweep or cyclic voltammetry, rotating disk electrochemistry, and chronocoulometry. All of the diffusion coefficients listed herein were measured using cyclic voltammetry as described herein. First, a stock solution (100 ml) containing 1–2 mM of the desired analyte in propylene carbonate/0.2 M tetraethylammonium tetrafluoroborate was prepared. This solution was then introduced into a standard three-electrode electrochemical cell and a series of cyclic voltammograms was run at sweep rates ranging from 10 to 100 mV/s. Peak currents obtained from these voltammograms were plotted against the square root of sweep rate and the diffusion coefficient of the analyte was calculated from the slope using the relation $$i_p = (2.69 \times 10^5) n^{3/2} A D_o^{1/2} v^{1/2} C_o^* \text{ (at 25}^\circ \text{ C.)}$$

(where $i_p$ represents peak current (in amperes), n is the number of electrons transferred during the redox process, A is the area of the working electrode (in $cm^2$), $D_o$ is the diffusion coefficient (in $cm^2/s$), v is the sweep rate (in V/s), and $C_o^*$ represents the bulk concentration of the analyte (in $mol/cm^3$))—from A. J. Bard and L. R. Faulkner in *Electrochemical Methods: Fundamentals and Applications*, Wiley & Sons, New York, 1980,p.218.

The diffusion coefficient of ferrocene in acetonitrile was measured in this fashion, and found to be in good agreement with the literature value of $2.4 \times 10^{-5}$ $cm^2/s$ (Kuwana, T., Bublitz, D. E., and Hoh, G. *J. Am. Chem. Soc.* 1960, 82, 5811). Diffusion coefficients for several of the compounds listed in Table I were also measured by rotating disk electrochemistry and by chronocoulometry; these values were in good agreement with those measured by cyclic voltammetry.

TABLE I

| Anodic/Cathodic Material | D($cm^2/s$) |
|---|---|
| Methylviologen [$BF_4$]$_2$ | $6.79 \times 10^{-6}$ |
| Ethylviologen [$BF_4$]$_2$ | $6.03 \times 10^{-6}$ |
| Octylviologen [$BF_4$]$_2$ | $4.07 \times 10^{-6}$ |
| 1,1'-bis(3-(triphenylphosphonium)propyl)-4,4'-dipyridinium tetrakis(tetrafluoroborate) | $1.94 \times 10^{-6}$ |
| 1,1'-bis(6-(triphenylphosphonium)hexyl)-4,4'-dipyridinium tetrakis(tetrafluoroborate) | $2.01 \times 10^{-6}$ |
| N,N'-bis(3-(triphenylphosphonium)propyl)-3,8-phenanthrolinium tetrakis(tetrafluoroborate) | $1.90 \times 10^{-6}$ |
| N,N'-bis(5-(triphenylphosphonium)pentyl)-1,4,5,8-naphthalenetetracarboxylic diimidium bis(tetrafluoroborate) | $3.30 \times 10^{-6}$ |
| Ferrocene | $1.05 \times 10^{-5}$ |
| 5,10-dimethyl-5,10-dihydrophenazine | $1.14 \times 10^{-5}$ |
| Bis-5,10-[2-(triethylammonium)ethyl]-5,10-dihydrophenazine bis(tetrafluoroborate) | $2.58 \times 10^{-6}$ |
| Bis-5,10-[4-(triethylammonium)butyl]-5,10-dihydrophenazine bis(tetrafluoroborate) | Not Available |
| 3,10-dimethoxy-7,14-(4-triethylammoniumbutyl)-tripheno-dithiazine bis(tetrafluoroborate) | $2.69 \times 10^{-6}$ |
| TMBYHB | $4.78 \times 10^{-6}$ |

As can be seen from the data collected in the experiments provided above, the novel anodic and cathodic materials comprising one or more diffusion coefficient controlling, second moieties which are appended to a conventional, first moiety exhibited a material reduction in diffusion coefficient relative to their counterpart, conventional materials which were unsubstituted or simple substituted (i.e. first moieties) without the one or more diffusion coefficient controlling, second moieties.

In further support of the present invention, two device experiments were conducted. In the first experiment, device current was measured for two electrochromic devices; one device utilized conventional anodic and cathodic materials, and the second utilized a novel cathodic material having a pair of diffusion coefficient controlling moieties appended to a conventional cathodic material. In the second experiment the formation of color bands or segregration was analyzed in both devices.

In particular, an electrochromic device was fabricated using two sheets of fluorine-doped tin oxide coated glass (one of which had been previously silvered on the back surface) cut in the shape of a standard automotive inside rearview mirror. The glass surfaces were held in a parallel, spaced-apart relationship (137 $\mu$m cell spacing) by an epoxy seal around the periphery, and the device was filled with a fluid electrochromic medium by a conventional vacuum backfilling technique. The electrochromic medium in this device comprised 5,10-dimethyl-5,10-dihydrophenazine (27 mM), octyl viologen tetrafluoroborate (32 mM), Tinuvin P (Ciba Geigy, Tarrytown, N.Y., 30 mM) polymethylmethacrylate (3% by weight) in propylene carbonate as a solvent. At open circuit, the visible light reflectance of the element was 79%. When 1.2 volts was applied to the element, it darkened to 8% reflectance, and the current at this reflectance level was 126 mA.

For comparison purposes, a second electrochromic device was fabricated as above, except that the device was filled with a fluid electrochromic medium comprising 5,10-dimethyl-5,10-dihydrophenazine (21 mM), 1,1'-bis(6-(triphenyl-phosphonium)hexyl)-4,4'-dipyridinium tetrakis (tetrafluoroborate) (42 mM), Tinuvin P (Ciba Geigy, Tarrytown, N.Y., 30 mM), and polymethylmethacrylate (3% by weight) in propylene carbonate as a solvent. At open circuit, the white light reflectance of the element was 79%. When 1.2 volts was applied to the element, it darkened to 8% reflectance, and the current at this reflectance level was 72 mA.

Devices filled according to the examples above were left in the fully darkened state (at 1.2 Volts) for a period of several hours. The device filled with the medium comprising octyl viologen showed substantial segregation (development of green and blue color bands), while the device filled with the medium comprising 1,1'-bis(6-(triphenylphosphonium) hexyl)-4,4'-dipyridinium tetrakis(tetrafluoroborate) displayed very little segregation.

As can be seen from the device experiments provided above, the novel low diffusion coefficient materials of the present invention enable an associated device to operate at a materially lower current relative to a similarly configured device which utilizes conventional anodic and/or cathodic materials. Furthermore, the formation of color bands or segregation is materially reduced.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic medium for use in an electrochromic device, comprising:
   at least one solvent;
   an anodic electroactive material;
   a cathodic electroactive material;
   wherein at least one of the anodic and cathodic electroactive materials is electrochromic;
   wherein the anodic electroactive material comprises a diffusion coefficient less than approximately $8.00 \times 10^{-6}$ $cm^2/s$ in propylene carbonate at approximately 25 degrees centigrade; and wherein the anodic electroactive material comprises a diffusion coefficient controlling moiety which is non-redox active during normal operation of an associated electrochromic device.

2. The electrochromic medium according to claim 1, wherein the anodic electroactive material comprises a diffusion coefficient less than approximately $5.00 \times 10^{-6}$ cm$^2$/s in propylene carbonate at approximately 25 degrees centigrade.

3. The electrochromic medium according to claim 1, wherein the anodic electro active material comprises a diffusion coefficient less than approximately $3.00 \times 10^{-6}$ cm$^2$/s in propylene carbonate at approximately 25 degrees centigrade.

4. The electrochromic medium according to claim 1, wherein the at least one solvent is selected from the group comprising sulfolanes, nitriles, sulfoxides, formamides, ethers, alcohols, ketones, esters, carbonates, and homogenous mixtures of the same.

5. The electrochromic medium according to claim 1, wherein the concentration of the anodic electroactive material ranges from approximately 1 mM to approximately 500 mM.

6. The electrochromic medium according to claim 1, wherein the concentration of the anodic electro active material ranges from approximately 2 mM to approximately 100 mM.

7. The electrochromic medium according to claim 1, wherein the anodic electroactive material is represented by at least one of the formulae:

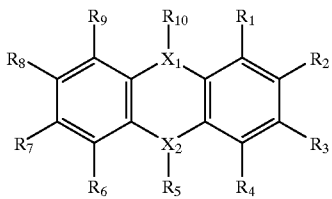
(A1)

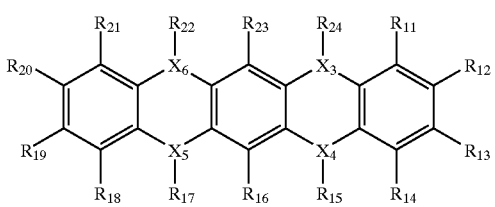
(A2)

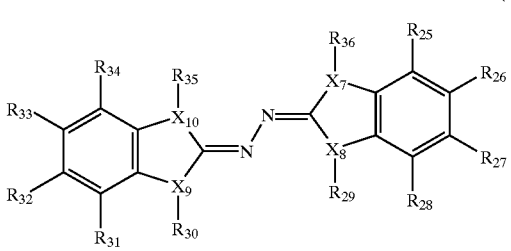
(A3)

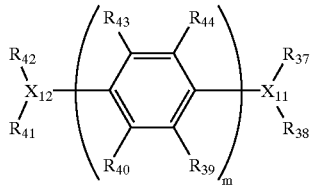
(A4)

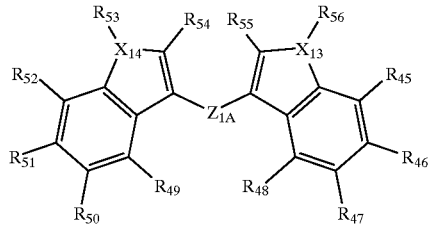
(A5)

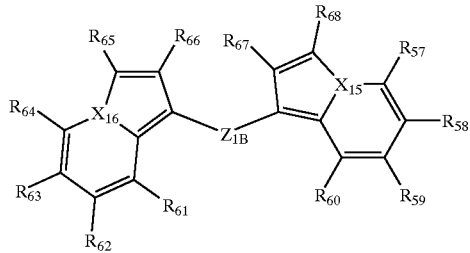
(A6)

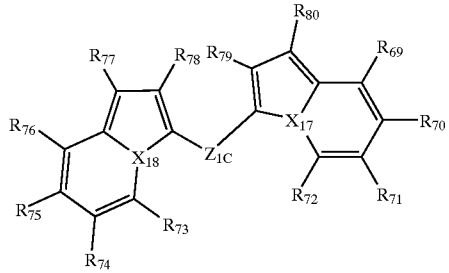
(A7)

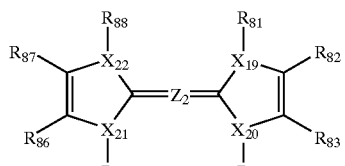
(A8)

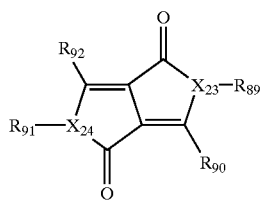
(A9)

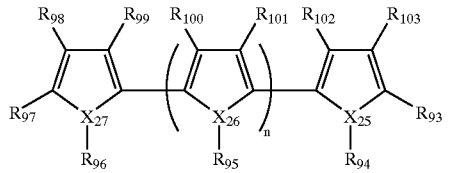
(A10)

wherein $Z_2$ comprises =CH—$[Z_{1A}]_t$—CH=, or =N—$[Z_{1A}]_t$—N=;

wherein t is an integer ranging from 0 to approximately 4;

wherein $R_1$–$R_{170}$ are the same or different and comprise a lone electron pair, H, a halogen, a straight or branched alkyl, aryl, alkaryl, aralkyl, or alkoxy group containing 1 to approximately 50 carbon atom(s), wherein the carbon atoms may be a linking group to, or part of, one or more functional groups comprising alcohols; thiols; thioethers; nitriles; nitro constituents; sulfoxides; sulfonates; phosphonium constituents; phosphonates; phosphonites; ammonium constituents; carbonyls, including carbonates, carbamates; ketones; esters; and amides; ethers, including polyethers; amines, including tertiary amines; and mixtures thereof; and wherein $R_1$–$R_{170}$ are non-redox active during normal operation of an associated electrochromic device.

8. An electrochromic medium for use in an electrochromic device, comprising:

at least one solvent;

an anodic electroactive material;

a cathodic electroactive material;

wherein at least one of the anodic and cathodic electroactive materials is electrochromic; and wherein the anodic electroactive material is represented by at least one of the formulae:

wherein $X_1$–$X_{42}$ are the same or different and comprise a single bond, N, O, S or Se;

wherein m is an integer ranging from 1 to approximately 3;

wherein n is an integer ranging from 0 to approximately 10;

wherein $Z_{1A-E}$ are the same or different and comprise —[CH=CH]$_S$—, —[C≡C]$_S$—, —N=N—, or p-phenyl;

wherein s is an integer ranging from 0 to approximately 4;

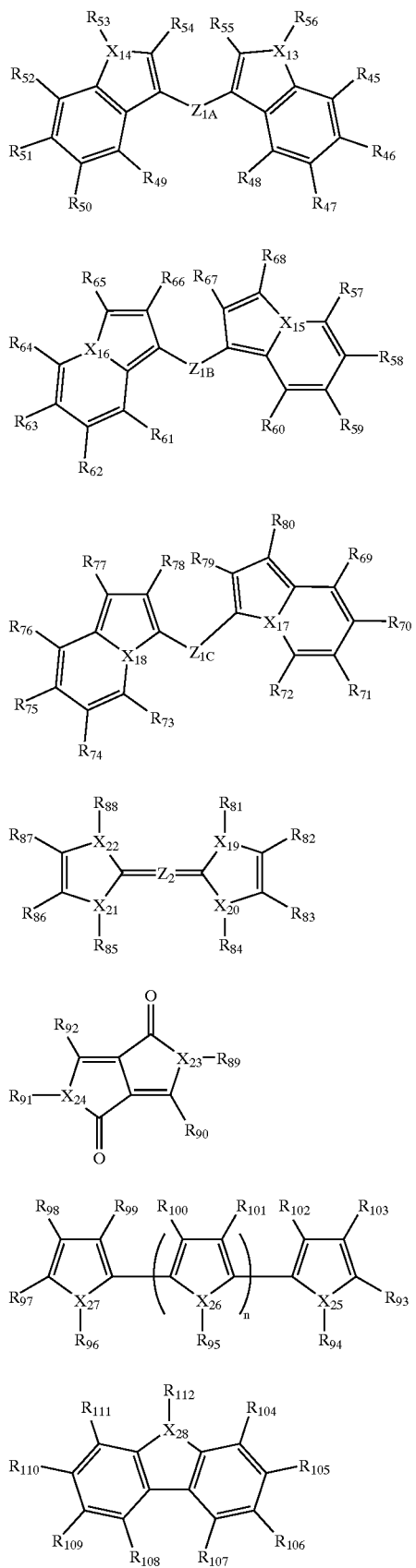
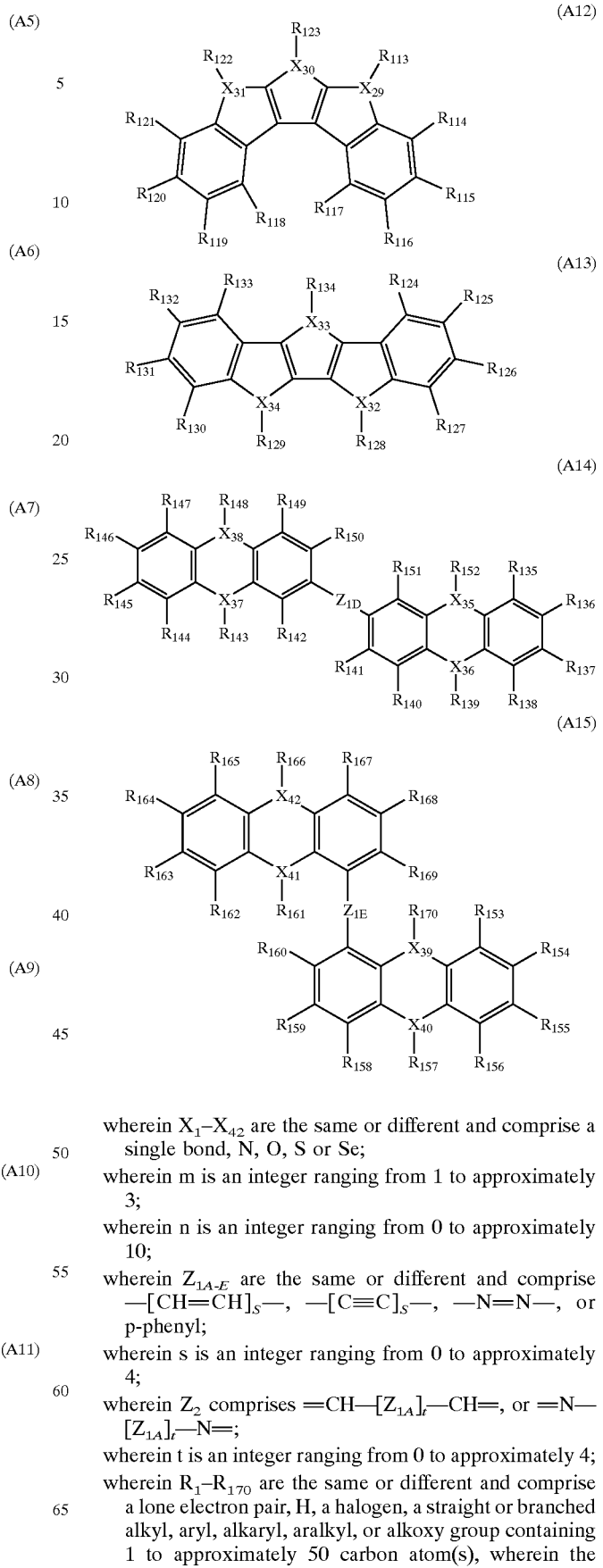

wherein $X_1$–$X_{42}$ are the same or different and comprise a single bond, N, O, S or Se;

wherein m is an integer ranging from 1 to approximately 3;

wherein n is an integer ranging from 0 to approximately 10;

wherein $Z_{1A\text{-}E}$ are the same or different and comprise —[CH=CH]$_S$—, —[C≡C]$_S$—, —N=N—, or p-phenyl;

wherein s is an integer ranging from 0 to approximately 4;

wherein $Z_2$ comprises =CH—[$Z_{1A}$]$_t$—CH=, or =N—[$Z_{1A}$]$_t$—N=;

wherein t is an integer ranging from 0 to approximately 4;

wherein $R_1$–$R_{170}$ are the same or different and comprise a lone electron pair, H, a halogen, a straight or branched alkyl, aryl, alkaryl, aralkyl, or alkoxy group containing 1 to approximately 50 carbon atom(s), wherein the carbon atoms may be a linking group to, or part of, one or more functional groups comprising alcohols; thiols; thioethers; nitriles; nitro constituents; sulfoxides; sulfonates; phosphonium constituents; phosphonates; phosphonites; ammonium constituents; carbonyls, including carbonates, carbamates; ketones; esters; and amides; ethers, including polyethers; amines, including tertiary amines; and mixtures thereof, and wherein at least one of $R_1$–$R_{10}$ of A1, $R_{11}$–$R_{24}$ of A2, $R_{25}$–$R_{36}$ of A3, $R_{37}$–$R_{44}$ of A4, $R_{45}$–$R_{56}$ of A5, $R_{57}$–$R_{68}$ of A6, $R_{69}$–$R_{80}$ of A7, $R_{81}$–$R_{88}$ of A8, $R_{89}$–$R_{92}$ of A9, $R_{93}$–$R_{103}$ of A10, $R_{104}$–$R_{112}$ of A11, $R_{113}$–$R_{123}$ of A12, $R_{124}$–$R_{134}$ of A13, $R_{135}$–$R_{152}$ of A14, and $R_{153}$–$R_{170}$ of A15 comprises a diffusion coefficient controlling moiety which cooperatively interacts with the at least one solvent.

9. The electrochromic medium according to claim 8, wherein $R_1$–$R_{170}$ are non-redox active during normal operation of an associated electrochromic device.

10. The electrochromic medium according to claim 9, wherein at least one of $R_1$–$R_{170}$ comprises a diffusion coefficient controlling moiety which is ionic.

11. The electrochromic medium according to claim 10, wherein at least one of $R_1$–$R_{170}$ comprises a diffusion coefficient controlling moiety which is cationic.

12. The electrochromic medium according to claim 11, wherein at least two of $R_1$–$R_{170}$ comprise a diffusion coefficient controlling moiety which is cationic.

13. The electrochromic medium according to claim 8, wherein the anodic electroactive material comprises a diffusion coefficient less than approximately $8.00 \times 10^{-6}$ cm²/s in propylene carbonate at approximately 25 degrees centigrade.

14. The electrochromic medium according to claim 8, wherein the anodic electroactive material comprises a diffusion coefficient less than approximately $5.00 \times 10^{-6}$ cm²/s in propylene carbonate at approximately 25 degrees centigrade.

15. The electrochromic medium according to claim 8, wherein the anodic electroactive material comprises a diffusion coefficient less than approximately $3.00 \times 10^{-6}$ cm²/s in propylene carbonate at approximately 25 degrees centigrade.

16. The electrochromic medium according to claim 8, wherein the at least one solvent is selected from the group comprising sulfolanes, nitriles, sulfoxides, formamides, ethers, alcohols, ketones, esters, carbonates, and homogenous mixtures of the same.

17. The electrochromic medium according to claim 8, wherein the concentration of the anodic electroactive material ranges from approximately 1 mM to approximately 500 mM.

18. The electrochromic medium according to claim 8, wherein the concentration of the anodic electroactive material ranges from approximately 2 mM to approximately 100 mM.

19. An electrochromic medium for use in an electrochromic device, comprising:
at least one solvent;
an anodic electroactive material;
a cathodic electroactive material;
wherein at least one of the anodic and cathodic electroactive materials is electrochromic; and
wherein the anodic electroactive material includes:
a first moiety; and
a diffusion coefficient controlling moiety, wherein the diffusion coefficient controlling moiety comprises at least one constituent which serves to decrease the diffusion coefficient of the first moiety in the at least one solvent relative to the first moiety without the diffusion coefficient controlling moiety.

20. The electrochromic medium according to claim 19, wherein the anodic electroactive material comprises a diffusion coefficient less than approximately $8.00 \times 10^{-6}$ cm²/s in propylene carbonate at approximately 25 degrees centigrade.

21. The electrochromic medium according to claim 19, wherein the anodic electroactive material comprises a diffusion coefficient less than approximately $5.00 \times 10^{-6}$ cm²/s in propylene carbonate at approximately 25 degrees centigrade.

22. The electrochromic medium according to claim 19, wherein the anodic electroactive material comprises a diffusion coefficient less than approximately $3.00 \times 10^{-6}$ cm²/s in propylene carbonate at approximately 25 degrees centigrade.

23. An electrochromic medium for use in an electrochromic device, comprising:
at least one solvent;
an anodic electroactive material;
a cathodic electroactive material;
wherein at least one of the anodic and cathodic electroactive materials is electrochromic;
wherein the cathodic electroactive material comprises a diffusion coefficient less than approximately $3.00 \times 10^{-6}$ in propylene carbonate at approximately 25 degrees centigrade; and
wherein the cathodic electroactive material is represented by at least one of the formulae:

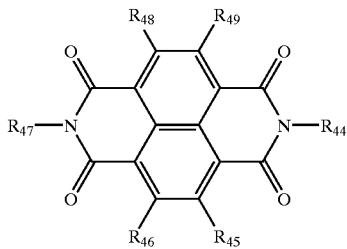

wherein $R_1$–$R_{49}$ are the same or different and comprise H, a halogen, a straight or branched alkyl, aryl, alkaryl, aralkyl, or alkoxy group containing 1 to approximately 50 carbon atom(s), wherein the carbon atoms may be a linking group to, or part of, one or more functional groups comprising alcohols; thiols; thioethers; nitriles; nitro constituents; sulfoxides; sulfonates; phosphonium constituents; phosphonates; phosphonites; ammonium constituents; carbonyls, including carbonates, carbamates; ketones; esters; and amides; ethers, including polyethers; amines, including tertiary amines; and mixtures thereof; and wherein $R_1$–$R_{49}$ are non-redox active during normal operation of an associated electrochromic device.

24. The electrochromic medium according to claim 23, wherein at least one of $R_1$–$R_{10}$ of C1, $R_{11}$–$R_{29}$ of C2, $R_{30}$–$R_{39}$ of C3, $R_{40}$–$R_{43}$ of C4, and $R_{44}$–$R_{49}$ of C5 comprises a diffusion coefficient controlling moiety which cooperatively interacts with the at least one solvent.

25. The electrochromic medium according to claim 23, wherein the cathodic electroactive material comprises a diffusion coefficient less than approximately $2.00 \times 10^{-6}$ cm$^2$/s in propylene carbonate at approximately 25 degrees centigrade.

26. The electrochromic medium according to claim 25, wherein at least one of $R_1$–$R_{10}$ of C1, $R_{11}$–$R_{29}$ of C2, $R_{30}$–$R_{39}$ of C3, $R_{40}$–$R_{43}$ of C4, and $R_{44}$–$R_{49}$ of C5 comprises a diffusion coefficient controlling moiety which cooperatively interacts with the at least one solvent.

27. The electrochromic medium according to claim 23, wherein the at least one solvent is selected from the group comprising sulfolanes, nitriles, sulfoxides, formamides, ethers, alcohols, ketones, esters, carbonates, and homogenous mixtures of the same.

28. The electrochromic medium according to claim 23, wherein the concentration of the cathodic electroactive material ranges from approximately 1 mM to approximately 500 mM.

29. The electrochromic medium according to claim 23, wherein the concentration of the cathodic electroactive material ranges from approximately 2 mM to approximately 100 mM.

30. An electrochromic medium for use in an electrochromic device, comprising:
at least one solvent;
an anodic electroactive material;
a cathodic electroactive material;
wherein at least one of the anodic and cathodic electroactive materials is electrochromic; and
wherein the cathodic electroactive material is represented by at least one of the formulae:

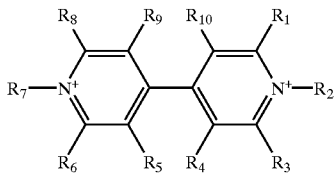

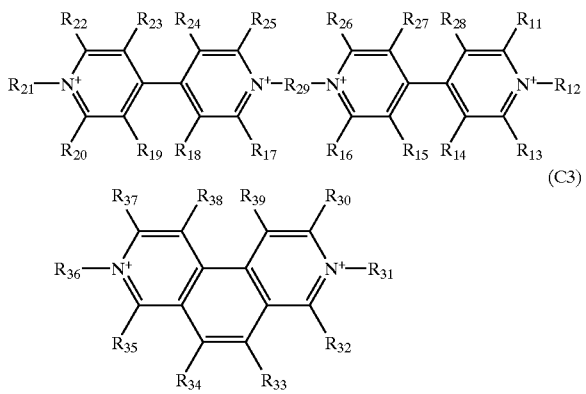

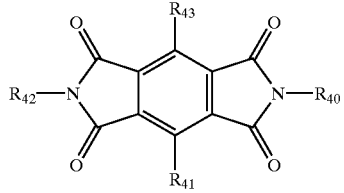

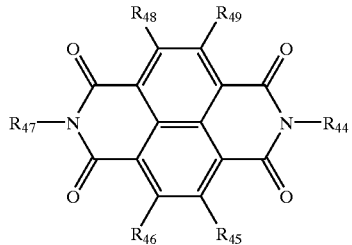

wherein $R_1$–$R_{49}$ are the same or different and comprise H, a halogen, a straight or branched alkyl, aryl, alkaryl, aralkyl, or alkoxy group containing 1 to approximately 50 carbon atom(s), wherein the carbon atoms may be a linking group to, or part of, one or more functional groups comprising alcohols; thiols; thioethers; nitriles; nitro constituents; sulfoxides; sulfonates; phosphonium constituents; phosphonates; phosphonites; ammonium constituents; carbonyls, including carbonates, carbamates; ketones; esters; and amides; ethers, including polyethers; amines, including tertiary amines; and mixtures thereof;

wherein $R_1 R_{49}$ are non-redox active during operation of an associated electrochromic device; and wherein at least one $R_1$–$R_{10}$ of C1, $R_{11}$–$R_{29}$ of C2, $R_{30}$–$R_{39}$ of C3, $R_{40}$–$R_{43}$ of C4, and $R_{44}$–$R_{49}$ of C5 comprises a diffusion coefficient controlling moiety which cooperatively interacts with the at least one solvent.

31. The electrochromic medium according to claim 30, wherein at least one of $R_1$–$R_{49}$ comprises a diffusion coefficient controlling moiety which is ionic.

32. The electrochromic medium according to claim 31, wherein at least one of $R_1$–$R_{49}$ comprises a diffusion coefficient controlling moiety which is cationic.

33. The electrochromic medium according to claim 30, wherein at least two of $R_1$–$R_{49}$ comprise a diffusion coefficient controlling moiety which is ionic.

34. The electrochromic medium according to claim 33, wherein at least two of $R_1$–$R_{49}$ comprise a diffusion coefficient controlling moiety which is cationic.

35. The electrochromic medium according to claim 30, wherein the at least one solvent is selected from the group comprising sulfolanes, nitriles, sulfoxides, formamides, ethers, alcohols, ketones, esters, carbonates, and homogenous mixtures of the same.

36. The electrochromic medium according to claim 30, wherein the concentration of the cathodic electroactive material ranges from approximately 1 mM to approximately 500 mM.

37. The electrochromic medium according to claim 30, wherein the concentration of the cathodic electro active material ranges from approximately 2 mM to approximately 100 mM.

38. An electrochromic medium for use in an electrochromic device, comprising:
   at least one solvent;
   an anodic electroactive material;
   a cathodic electroactive material;
   wherein at least one of the anodic and cathodic electroactive materials is electrochromic; and
   wherein the cathodic electroactive material includes:
      a first moiety; and
      a diffusion coefficient controlling moiety, wherein the diffusion coefficient controlling moiety comprises at least one constituent which serves to decrease the diffusion coefficient of the first moiety in the at least one solvent relative to the first moiety without the diffusion coefficient controlling moiety.

39. An electrochromic medium for use in an electrochromic device, comprising:
   at least one solvent;
   an anodic electroactive material;
   a cathodic electroactive material;
   wherein at least one of the anodic and cathodic electroactive materials is electrochromic; and
   wherein at least one of the anodic and cathodic electroactive material includes:
      a first moiety; and
      a diffusion coefficient controlling moiety, wherein the diffusion coefficient controlling moiety comprises at least one constituent which serves to decrease the diffusion coefficient of the first moiety in the at least one solvent relative to the first moiety without the diffusion coefficient controlling moiety.

40. An electrochromic device, comprising:
   at least one substantially transparent substrate having an electrically conductive material associated therewith; and
   an electrochromic medium which comprises:
      at least one solvent;
      an anodic electroactive material;
      a cathodic electro active material;
      wherein at least one of the anodic and electro active materials is electrochromic; and
      wherein at least one of the anodic and cathodic electroactive materials comprises a diffusion coefficient controlling moiety which enables the electrochromic device to operate at a lower current relative to an electrochromic device without the at least one anodic and cathodic electroactive material which comprises the diffusion coefficient controlling moiety.

41. An electrochromic device, comprising:
   a first substantially transparent substrate having an electrically conductive material associated therewith;
   a second substrate having an electrically conductive material associated therewith; and
   an electrochromic medium contained within a chamber positioned between the first and second substrates which comprises:
      at least one solvent;
      an anodic electroactive material;
      a cathodic electroactive material;
      wherein the anodic electroactive material is represented by at least one of the formulae:

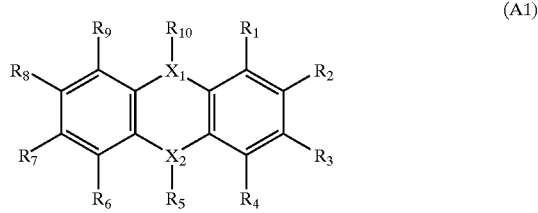

(A1)

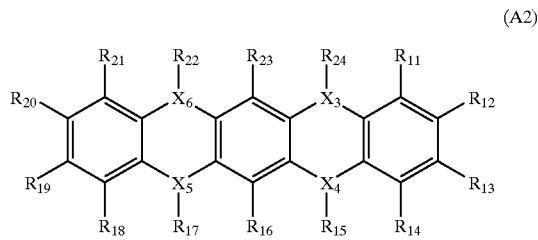

(A2)

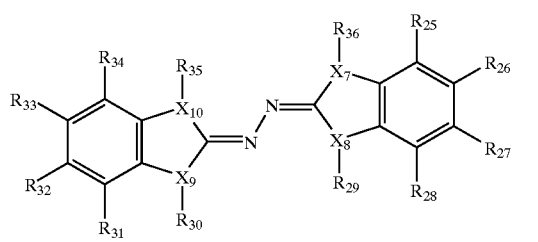

(A3)

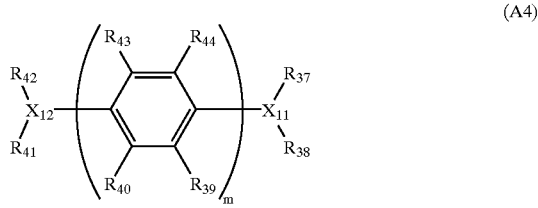

(A4)

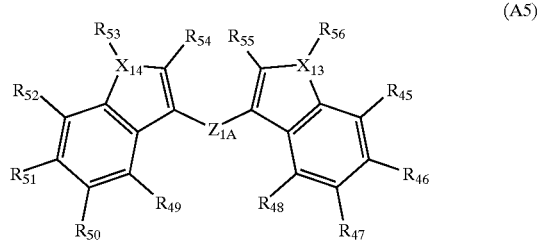

(A5)

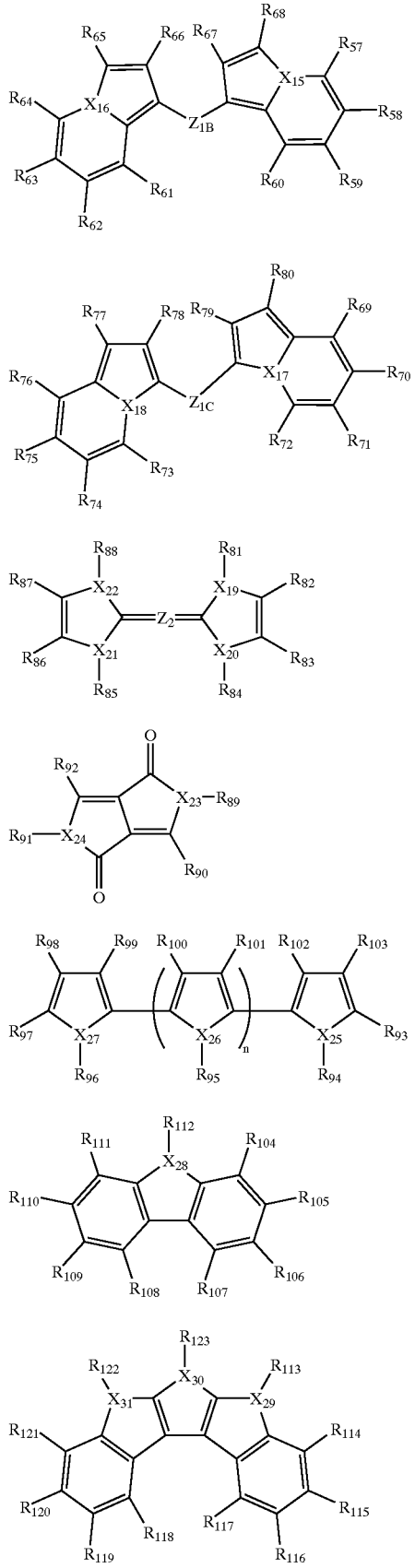

wherein $X_1$–$X_{42}$ are the same or different and comprise a single bond, N, O, S or Se;

wherein m is an integer ranging from 1 to approximately 3;

wherein n is an integer ranging from 0 to approximately 10;

wherein $Z_{1A-E}$ are the same or different and comprise —[CH═CH]$_s$—, —[C≡C]$_s$—, —N═N—, or p-phenyl;

wherein s is an integer ranging from 0 to approximately 4;

wherein $Z_2$ comprises ═CH—[$Z_{1A}$]$_t$—CH═, or ═N—[$Z_{1A}$]$_t$—N═;

wherein t is an integer ranging from 0 to approximately 4;

wherein $R_1$–$R_{170}$ of A1–A15 are the same or different and comprise a lone electron pair, H, a halogen, a straight or branched alkyl, aryl, alkaryl, aralkyl, or alkoxy group containing approximately 1 to approximately 50 carbon atom(s), wherein the carbon atoms may be a linking group to, or part of, one or more functional groups comprising alcohols; thiols; thioethers; nitriles; nitro constituents; sulfoxides; sulfonates; phosphonium constituents; phosphonates; phosphonites; ammonium constituents; carbonyls, including carbonates, carbamates; ketones; esters; and amides; ethers, including polyethers; amines, including tertiary amines; and mixtures thereof;

wherein $R_1$–$R_{170}$ of A1–A15 are non-redox active during normal operation of an associated electrochromic device;

wherein at least one of $R_1$–$R_{10}$ of A1, $R_{11}$–$R_{24}$ of A2, $R_{25}$–$R_{36}$ of A3, $R_{37}$–$R_{44}$ of A4, $R_{45}$–$R_{56}$ of A5, $R_{57}$–$R_{68}$ of A6, $R_{69}$–$R_{80}$ of A7, $R_{81}$–$R_{88}$ of A8, $R_{89}$–$R_{92}$ of A9, $R_{93}$–$R_{103}$ of A10, $R_{104}$–$R_{112}$ of A11, $R_{113}$–$R_{123}$ of A12, $R_{124}$–$R_{134}$ of A13, $R_{135}$–$R_{152}$ of A14, and $R_{153}$–$R_{170}$ of A15 comprises a diffusion coefficient controlling moiety which cooperatively interacts with the at least one solvent; and/or wherein the cathodic electroactive material is represented by at least one of the formulae:

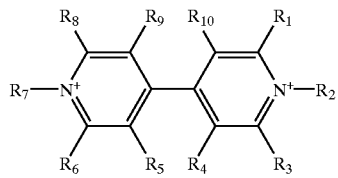
(C1)

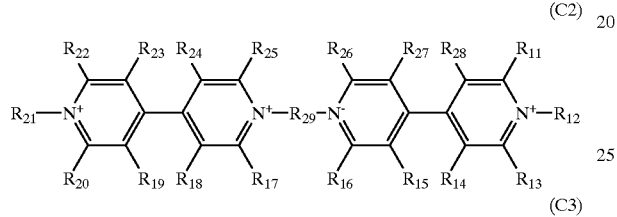
(C2)

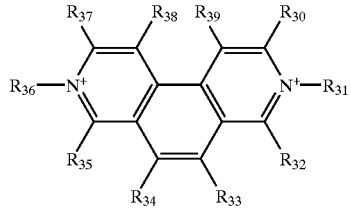
(C3)

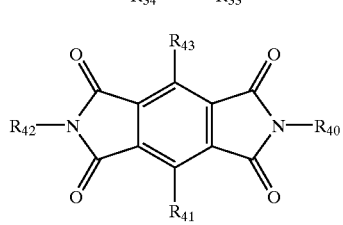
(C4)

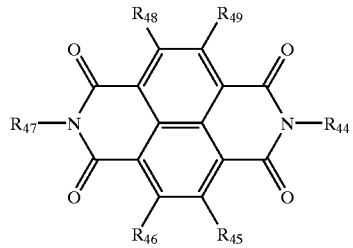
(C5)

wherein $R_1$–$R_{49}$ of C1–C5 are the same or different and comprise H, a halogen, a straight or branched alkyl, aryl, alkaryl, aralkyl, or alkoxy group containing 1 to approximately 50 carbon atom(s), wherein the carbon atoms may be a linking group to, or part of, one or more functional groups comprising alcohols; thiols; thioethers; nitriles; nitro constituents; sulfoxides; sulfonates; phosphonium constituents; phosphonates; phosphonites; ammonium constituents; carbonyls, including carbonates, carbamates; ketones; esters; and amides; ethers, including polyethers; amines, including tertiary amines; and mixtures thereof; and wherein $R_1$–$R_{49}$ of C1–C5 are non-redox active during normal operation of an associated electrochromic device.

42. The electrochromic device according to claim 41, wherein the device is an electrochromic window.

43. The electrochromic device according to claim 41, wherein the second substrate is plated with a reflective material.

44. The electrochromic device according to claim 43, wherein the reflective material is selected from the group comprising chromium, ruthenium, rhodium, silver, alloys of the same, and stacked layers thereof.

45. The electrochromic device according to claim 44, wherein the device is an electrochromic mirror.

* * * * *